(12) United States Patent
Carrier

(10) Patent No.: US 6,460,626 B2
(45) Date of Patent: Oct. 8, 2002

(54) DUAL-MODE NON-ISOLATED CORDED SYSTEM FOR TRANSPORTABLE CORDLESS POWER TOOLS

(75) Inventor: David A. Carrier, Aberdeen, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 09/911,985

(22) Filed: Jul. 24, 2001

(65) Prior Publication Data

US 2001/0042631 A1 Nov. 22, 2001

Related U.S. Application Data

(62) Division of application No. 09/458,285, filed on Dec. 10, 1999, now Pat. No. 6,296,065.
(60) Provisional application No. 60/142,218, filed on Dec. 30, 1998.

(51) Int. Cl.[7] .............................. B23B 45/02; H02J 7/00
(52) U.S. Cl. ......................... 173/1; 173/171; 173/217; 310/50
(58) Field of Search ........................... 173/1, 217, 171, 173/170; 310/47, 50

(56) References Cited

U.S. PATENT DOCUMENTS

| 3,079,510 A | 2/1963 | Hartwig |
| 3,769,568 A | 10/1973 | Hamilton et al. |
| 3,781,637 A | 12/1973 | Potter |
| 4,008,426 A | 2/1977 | Ogura |
| 4,143,307 A | 3/1979 | Hansen et al. |
| 4,244,021 A | 1/1981 | Chiles, III |
| 4,271,460 A | 6/1981 | Baker |
| 4,458,186 A | 7/1984 | Kuriyama et al. |

(List continued on next page.)

FOREIGN PATENT DOCUMENTS

| DE | 1563677 | 3/1970 |
| DE | 2836263 | 1/1979 |
| DE | 3636968 C2 | 5/1988 |
| DE | 3742240 A1 | 6/1989 |
| DE | 4041247 C2 | 7/1991 |
| DE | 19527201 A1 | 1/1997 |
| EP | 0024268 A1 | 2/1981 |
| EP | 0323813 | 11/1988 |
| EP | 0729211 A2 | 1/1996 |
| WO | WO 96/13889 | 5/1996 |

*Primary Examiner*—Scott A. Smith
(74) *Attorney, Agent, or Firm*—Harness, Dickey & Pierce, P.L.C.

(57) ABSTRACT

A dual-mode system for inexpensively operating electrically powered double-insulated devices (12), such as hand-held power tools and appliances. The system includes a cordless battery pack (14) that supplies the power and current demands of the device (12) in a cordless mode or a non-isolated corded voltage converter (16) that supplies the necessary power and current demands in a physical envelope commensurate in size and interchangeable with that of the battery pack (14). The corded voltage converter (16) is provided with a non-isolated high efficiency power supply that allows the converter (16) to generate the power and current required by the driven device (12). The double insulation of the driven device (12) negates the need for a transformer-isolated voltage converter. Eliminating the power transformer from the converter significantly reduces the cost of the module (16). Additionally, the need for multiple battery packs and fast rechargers is minimized by the availability of a low-cost converter. The voltage converter (16) includes an inrush current limiter (103) and power conditioner for filtering AC or DC input power. The filtered voltage is chopped by a transformerless buck-derived converter. The chopped voltage is rectified and filtered to provide low-voltage DC power to the drive motor of the powered double-insulated device (12).

12 Claims, 11 Drawing Sheets

U.S. PATENT DOCUMENTS

| | | |
|---|---|---|
| 4,621,313 A | 11/1986 | Kiteley |
| 4,835,410 A | 5/1989 | Bhagwat et al. |
| 4,839,570 A | 6/1989 | Saganovsky |
| 4,910,447 A | 3/1990 | Masters |
| 4,943,902 A | 7/1990 | Severinsky |
| 4,974,141 A | 11/1990 | Severinsky et al. |
| 4,999,556 A | 3/1991 | Masters |
| 5,257,155 A | 10/1993 | Robb et al. |
| 5,309,077 A | 5/1994 | Choi |
| 5,323,287 A | 6/1994 | Peter |
| 5,448,175 A | 9/1995 | Nishibe et al. |
| 5,508,602 A | 4/1996 | Borgato et al. |
| 5,553,675 A * | 9/1996 | Pitzen et al. ................. 173/217 |
| 5,640,315 A | 6/1997 | Hirano et al. |
| 5,816,121 A * | 10/1998 | Yoshimizu et al. ......... 173/217 |
| 5,984,020 A * | 11/1999 | Meyer et al. ................ 173/217 |
| 6,263,980 B1 * | 7/2001 | Wadge ........................ 173/171 |
| 6,286,609 B1 * | 9/2001 | Carrier et al. ................. 173/1 |
| 6,296,427 B1 * | 10/2001 | Potter et al. .................. 310/50 |

* cited by examiner

DUAL-MODE NON-ISOLATED CORDED SYSTEM FOR TRANSPORTABLE CORDLESS POWER TOOLS

CROSS-REFERENCE TO RELATED APPLICATIONS

This application claims the benefit of the filing date of U.S. provisional application No. 60/114,218 filed Dec. 30, 1998. This application is a divisional of U.S. application Ser. No. 09/458,285, filed Dec. 10, 1999 U.S. Pat. No. 6,296,065.

FIELD OF THE INVENTION

The present invention relates generally to electrically operated power tools and in particular, to portable hand-held power tools which can alternatively operate in either a cordless mode from a self-contained power source or a corded mode from a conventional AC/DC generator power source.

BACKGROUND OF THE INVENTION

Electrically operated devices that function in a cordless mode typically include a housing which has a chamber for receiving and retaining a removable battery pack. The battery pack completely encloses one or more cells and provides the necessary DC power for operation of the device. Historically, cordless electrically powered devices have included relatively low power devices such as shavers and hand-held calculators. Recently, improvements in battery technology have led to the development of batteries that store more energy and are capable of driving higher power devices. These devices include for example, portable hand-held power tools and appliances operating at power levels from 50 watts up to hundreds of watts. A hand-held power tool is typically powered by a battery pack that comprises a number of batteries connected in series. To provide the higher power levels required by high power devices an increased number of batteries are connected in series resulting in higher input voltages and battery pack volumetric requirements.

Cordless power devices permit work operations to be performed in areas where a conventional AC power source is not available or inconvenient to use. However, the effective charge capacity of the battery pack and the availability of replacement battery packs limit the use of cordless devices. When the battery pack is discharged, it must be recharged or replaced with a fully charged pack.

Both batteries and battery chargers are expensive in comparison to the power device for which they are intended. Batteries for high power applications cost approximately 30% of the cost of the applicable power device. Additional batteries are required to permit cordless mode operation while a battery is recharged and to replace dead batteries. High power levels drawn from batteries during operation of the power tool, the depth of discharge of the battery, the number of charge/discharge cycles, and the speed with which a battery is recharged all contribute to shortening the usable lifetime of a battery. Fast chargers can cost more than the power tool or appliance that is powered by the battery. There are two basic types of battery chargers, trickle chargers and fast chargers. Trickle chargers are significantly less expensive than fast chargers, however a trickle charger requires approximately ½ day to recharge a battery pack. A fast charger on the other hand can recharge a battery pack within approximately one hour. Therefore, a trade off must be made between using a trickle charger with a large number of battery packs versus using a costly fast charger with very few replacement battery packs.

It has recently been proposed to provide portable cordless power tools with an optional corded AC converter module that is connected to an AC power source and designed to replace the battery pack. The corded converter module converts power from the AC source to a regulated low-voltage DC level that is usable by the motor of the power device. Such a device allows a tool operator to use the tool in either the cordless battery mode or the corded AC mode as needed. Thus, the availability of such device enables the operator of a cordless tool to complete a project when the battery pack has been discharged, or to continue to use the tool while the battery pack is charging and a fully charged backup battery pack is unavailable. Hence, by using a corded converter module the need for extra battery packs is minimized.

However, the prior art design of a corded converter module is constrained by a number of factors such as the physical envelope, the required output power level, the voltage conversion ratio of the converter, safety requirements to protect the operator from electrical shock, and cost. The envelope of the corded converter module must conform to the envelope of the battery pack with which it is interchangeable. With the increased volumetric requirements for battery packs there is increased volume available for housing a corded converter. The power output level of the converter is directly related to the available volume within the container envelope. The power output levels adequate to drive power devices such as hand held power tools are possible within the physical envelope of commercial battery packs. The voltage conversion ratio of the converter is the ratio between the rectified input voltage and the converter output voltage. The converter output voltage is set to a level roughly equivalent to the battery voltage. The greater the voltage conversion ratio the more difficult it is to accurately regulate the output voltage. The safety regulations are typically met by isolating the operator of the power device from the AC power source. Commercially available systems meet the safety regulations by employing a high frequency power transformer to isolate the output power of the converter module from the relatively high voltage AC input power source. Power transformers are custom devices that are expensive and bulky in comparison with the other electronic devices of the converter module. Attempts to minimize costs of corded converter modules have concentrated on optimizing the output power capability of the converter module for a given power device. By designing the converter module for the minimum output power required to satisfactorily drive the power device, lower cost electronic components can be chosen for the converter.

Operators of cordless power tools already faced with the cost of battery packs and battery chargers must also invest in expensive corded converter modules for their power tools. As an alternative many purchase a corded power tool to use in lieu of the cordless tool when an AC power source is nearby. Attempts to minimize the cost of corded conversion modules have been constrained by the cost of using transformer isolation to meet the government safety requirements. Obtaining further cost reductions by reducing the output power level of a corded converter module would result in under-powered power devices. While the prior art can be used to provide corded converter modules for a handheld power tool, it has not proven capable of providing low cost modules that are convenient to use.

SUMMARY OF THE INVENTION

The present invention decreases costs by meeting the government safety requirements in a unique manner. The invention uses a double insulated casing for the power tool rather than employing transformer isolation. Eliminating the power transformer from the corded converter module significantly reduces the cost and weight of the module. A low cost converter module provides operators of cordless power tools the low cost option of using a corded converter module when AC power sources are available. This eliminates the cost of purchasing a separate corded power device as well as reducing the number of battery packs that must be purchased.

Corded power converters designed without power transformers are substantially less expensive than converters designed with power transformers. Additionally, eliminating the power transformer decreases the weight of the converter resulting in improved operator comfort.

For a more complete understanding of the invention, its objects and advantages, reference may be had to the following specification and to the accompanying drawings.

DETAILED DESCRIPTION OF THE PREFERRED EMBODIMENTS

Figure 1:
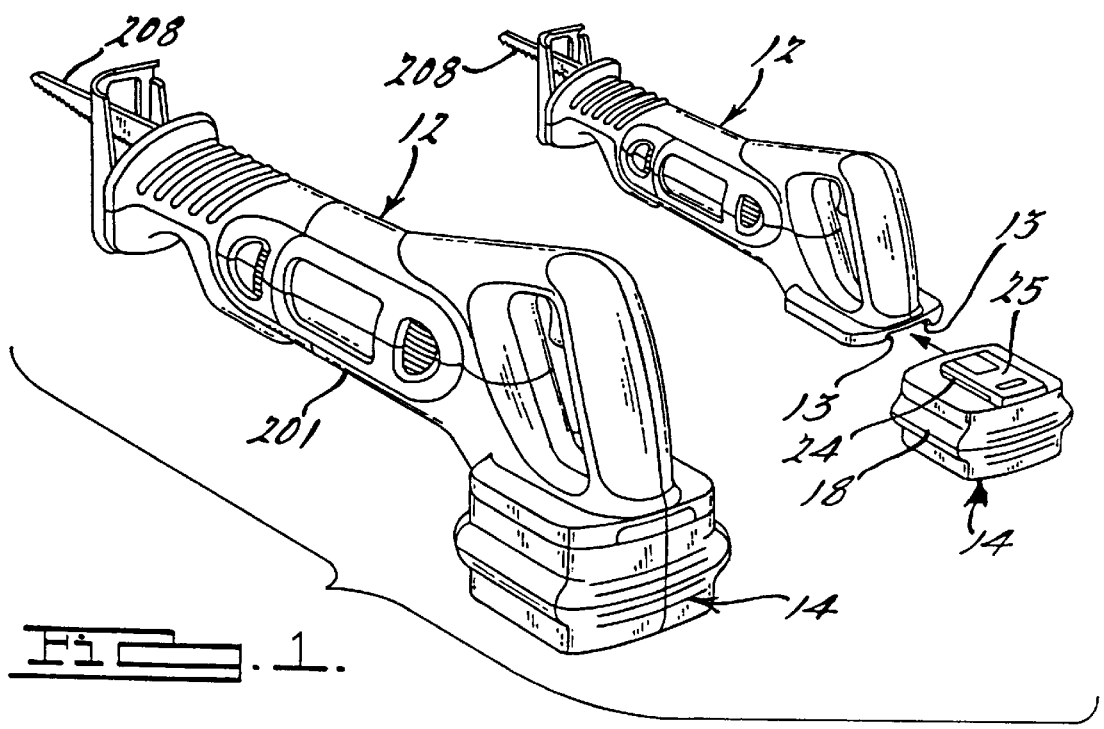
FIG. 1 is a three-dimensional view partially showing the manner of connecting a battery pack to the power device.
Figure 2:
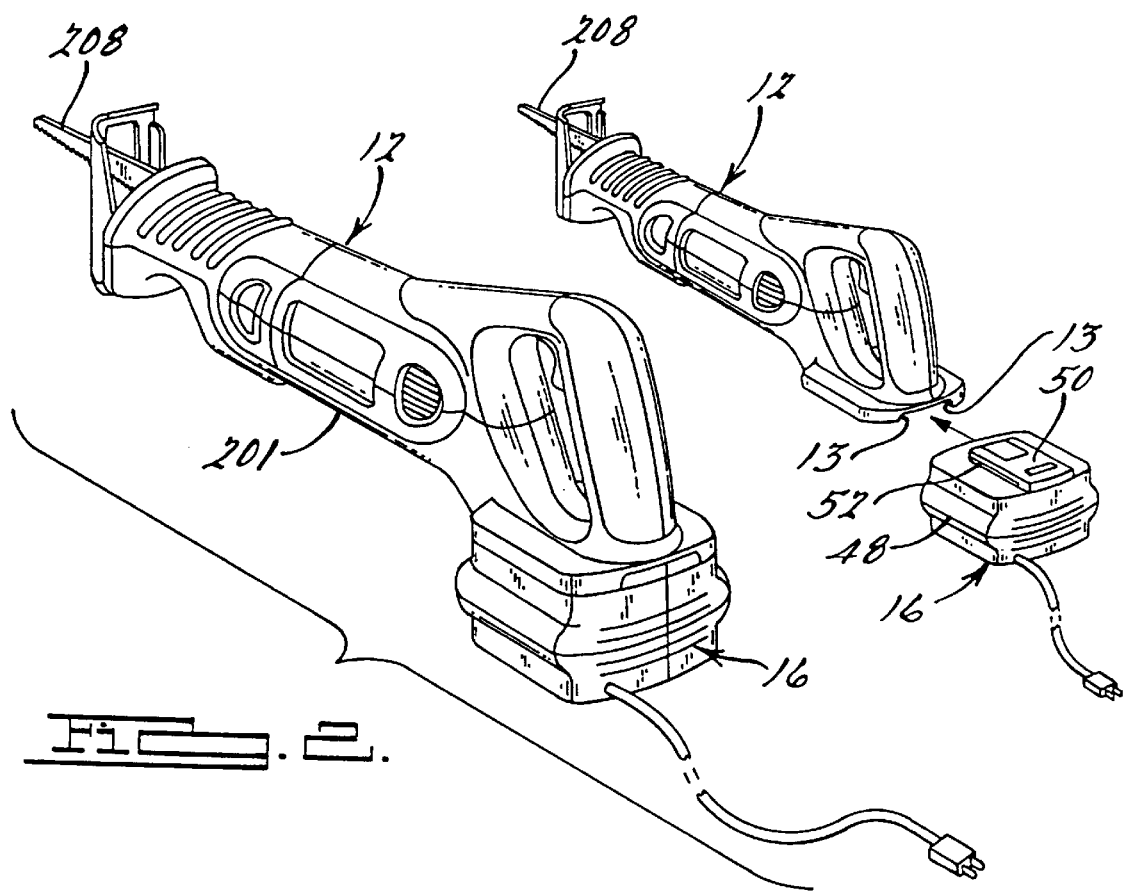
FIG. 2 is a three-dimensional view partially showing the manner of connecting an AC/DC power converter module to the power device.

Referring to FIGS. 1 and 2, a dual-mode portable power tool 12 according to the present invention is shown. While the present invention is shown and described with a reciprocating saw 12, it will be appreciated that the particular tool is merely exemplary and could be a circular saw, a drill, or any other similar portable power tool constructed in accordance with the teachings of the present invention.

The power tool 12 includes a DC motor (not shown) that is adapted in the preferred embodiment to be powered by a source having a relatively low voltage such as a 24 volt DC source, although other low voltage DC systems, such as 12 volts or 18 volts, could be used. In a first operating mode shown in FIG. 1, the power tool 12 is powered by a removable battery power supply module 14. Alternatively, as shown in FIG. 2, the power tool 12 may be powered from a source having a relatively high voltage such as common 115 volt AC line power via an AC/DC power converter module 16 which is adapted to be plugged into the power tool in place of the battery power supply module 14. Additionally, the power tool 12 may be powered from a relatively high voltage DC generator (not shown) via the AC/DC power converter module 16. As used in this specification and the accompanying claims, the term relatively high voltage means voltages of 40 volts or greater and the term relatively low voltage means voltages less than 40 volts.

Figure 3A:
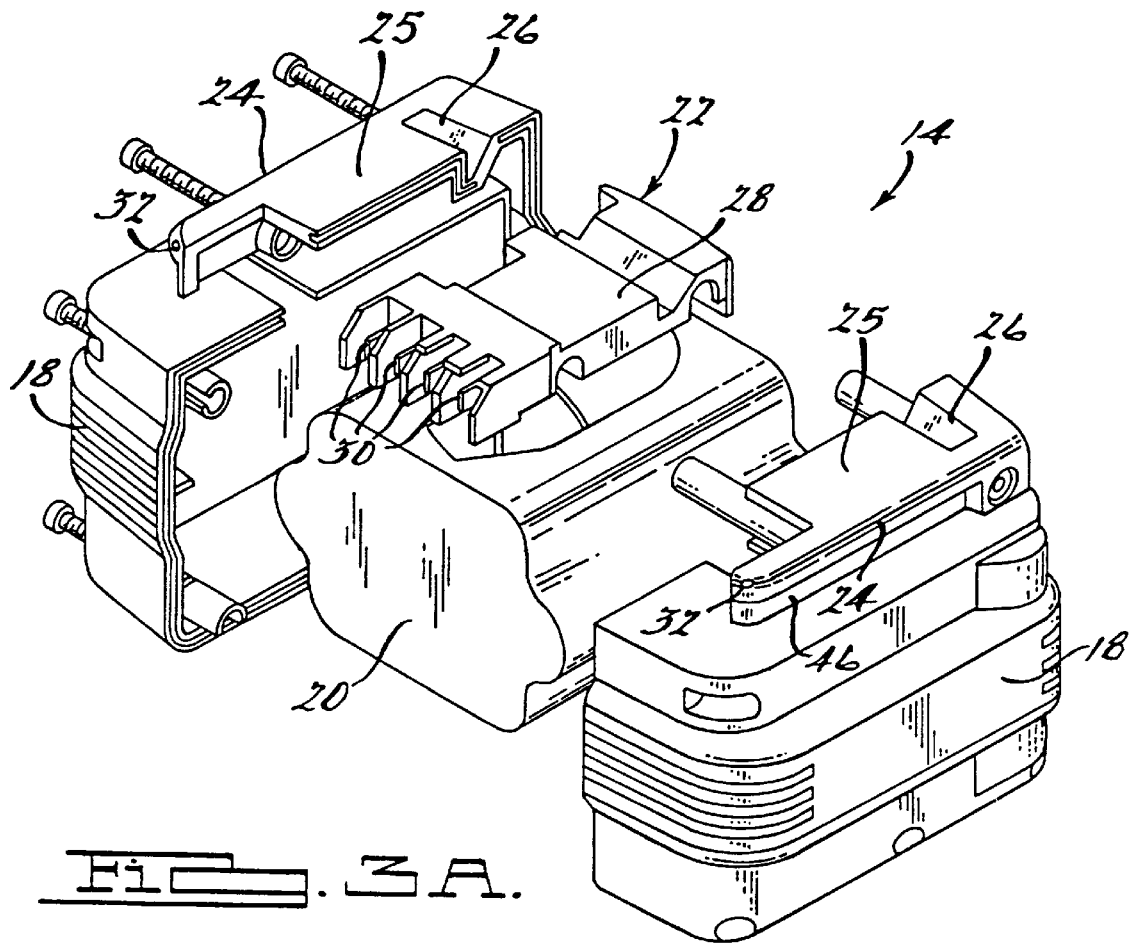
FIG. 3A is a three-dimensional exploded view of the battery pack.
Figure 4:
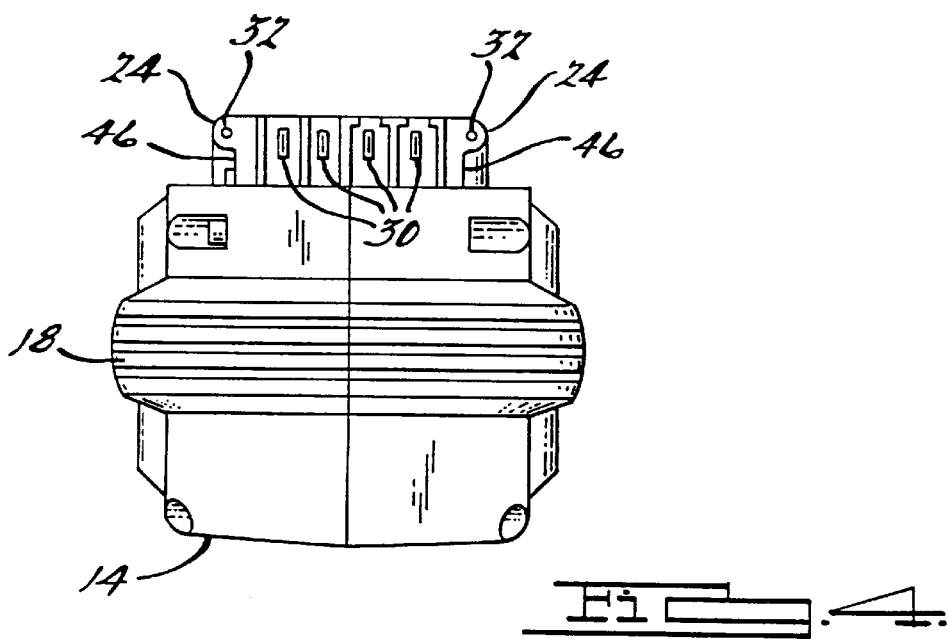
FIG. 4 is an end view of the battery pack illustrating an attached terminal block.

With particular reference to FIGS. 3A and 4, the rechargeable battery power supply module 14 of the present invention is illustrated to generally include a housing 18, a battery 20 which in the exemplary embodiment illustrated is a 24 volt nickel-cadmium battery, and a battery pack terminal block 22. To facilitate releasable attachment of the battery power supply module 14 to the tool 12, the upper portion 25 of the housing 18 is formed to include a pair of guide rails 24. The guide rails 24 are adapted to be slidably received into cooperating channels 13 (FIG. 1) formed in a housing 14 of the tool 12. To further facilitate removable attachment of the battery power supply module 14 to the tool 12, the upper portion 25 of the housing 18 further defines a recess 26. The recess 26 is adapted to receive a latch (not shown) carried by the housing of the tool 12. The latch is conventional in construction and operation and is spring biased to a downward position so as to engage the recess 26 upon insertion of the rechargeable battery power supply module 14. Removal of the battery power supply module 14 is thereby prevented until the spring bias of the latch is overcome in a conventional manner insofar as the present invention is concerned.

With continued reference to FIGS. 3A and 4, the battery pack terminal block 22 comprises a main body portion 28 constructed of rigid plastic or other suitable material and a plurality of blade-type terminals 30. In the exemplary embodiment illustrated, the battery pack terminal block 22 includes four blade terminals 30. Two of the blade terminals 30 comprise the positive and negative terminals for the battery 20. A third terminal 30 may be used to monitor the temperature of the battery 20 and a fourth terminal may be used to identify the battery type (e.g., 24 volt NiCad). As best shown in FIG. 4, a pair of holes 32 are formed in the two guide rails 24 in the upper portion 25 of the battery pack housing 18 on either side of the row of blade terminals 30. The function of these holes is described below.

Figure 5:
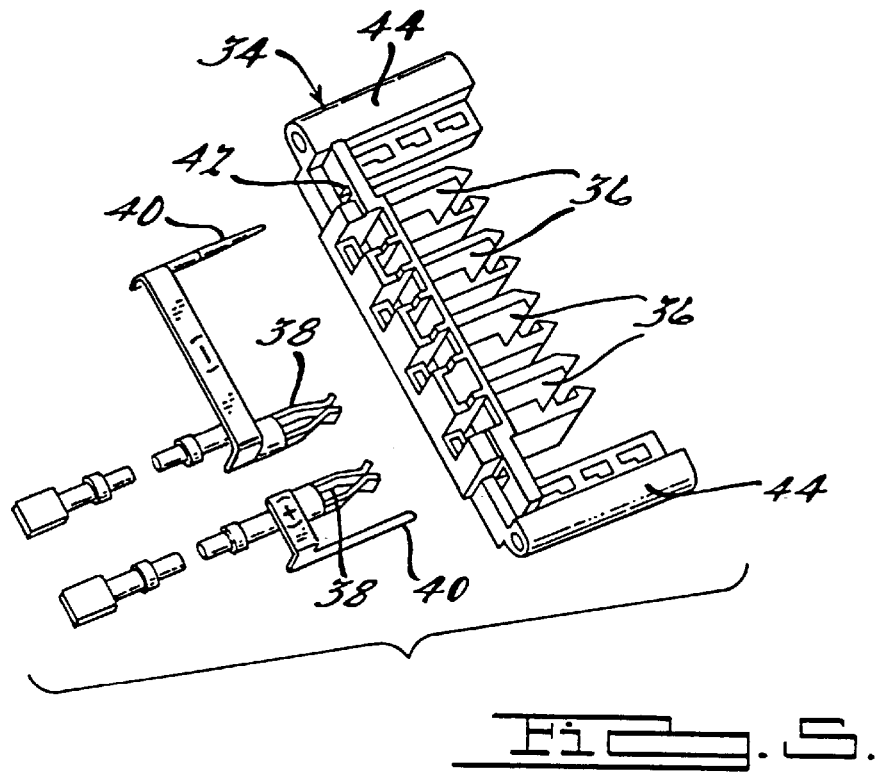
FIG. 5 is a three-dimensional view of the power tool terminal block that mates to the battery pack terminal block.

Turning now to FIG. 5, the terminal block 34 of the power tool 12 is shown. The main body of the tool terminal block 34 is also constructed of a rigid plastic material and is formed with a row of four U-shaped guideways 36 guiding the four corresponding blade terminals 30 of the battery power supply module 14 when the battery pack is inserted into the tool 12. Located within the guideways 36 are female connectors 38 that are adapted to engage and make electrical contact with the blade terminals 30 of the battery power supply module 14. Although the tool terminal block 34 shown is designed to accommodate four female connectors for each of the four battery pack blade terminals 30, only two female connectors 38 adapted to engage the positive and negative blade terminals 30 of the battery power supply module 14 are used in the tool terminal block 34, as the remaining two battery pack blade terminals 30 are only used when recharging the battery power supply module 14.

Also connected to the positive and negative female terminals 38 in the tool terminal block 34 are positive and negative male terminals 40 that project through openings 42 in the terminal block on either side of the row of guideways 36. As will subsequently be discussed below, the male positive and negative terminals 40 are used to electrically connect the tool 12 to the AC/DC converter module 16.

Figure 6:
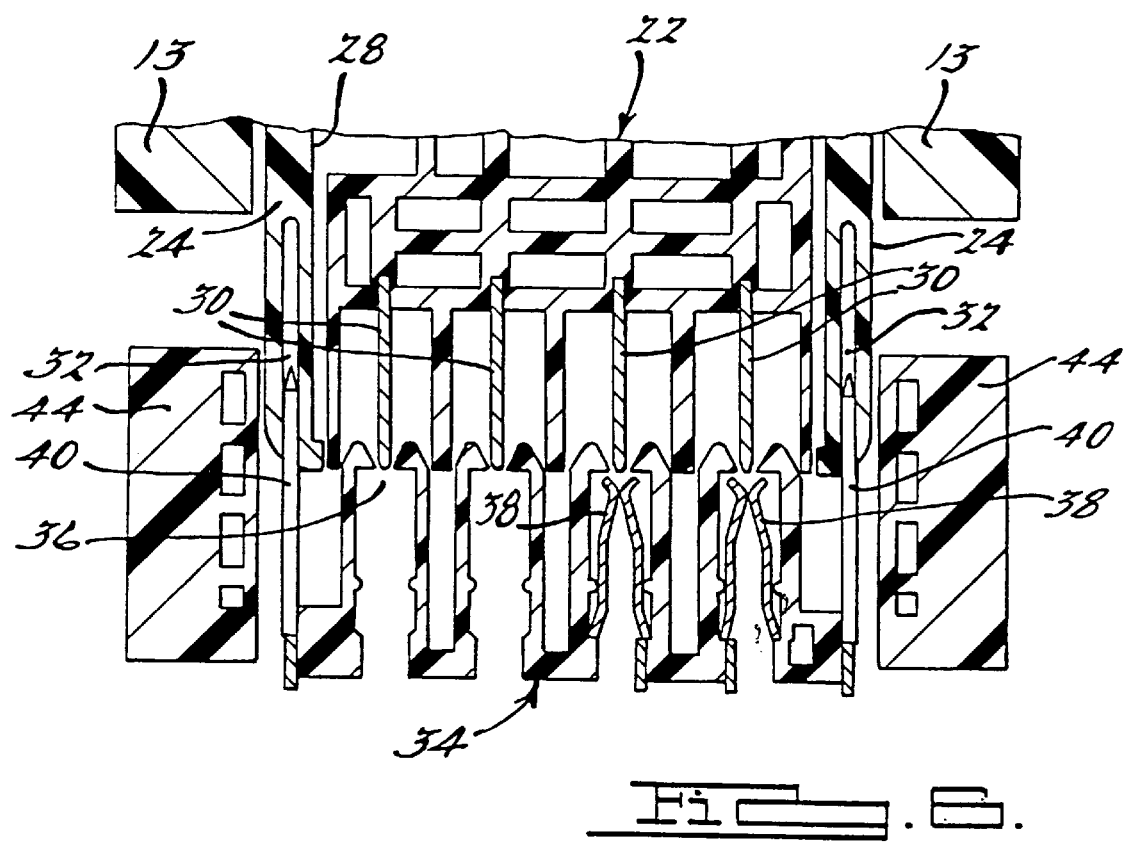
FIG. 6 is a two-dimensional view of the interface between the battery pack terminal block and the power tool terminal block.

With additional reference to FIG. 6, the interface between the battery terminal block 22 and the tool terminal block 34 is illustrated. As the guide rails 24 of the battery power supply module 14 are slid into the channels 13 in the tool housing, the battery pack terminal block 22 is guided into alignment with the tool terminal block 34 as shown. To further facilitate proper alignment between the two terminal blocks 22 and 34, the main body portion of the tool terminal block 34 includes a pair of laterally spaced rails 44 that are adapted to be received within the grooves 46 provided in the battery pack housing 18 immediately below the guide rails 24. Further insertion of the battery power supply module 14 onto the tool 12 results in the positive and negative blade terminals 30 of the battery power supply module 14 passing through the openings in the U-shaped guideways 36 and engaging the female connectors 38 in the tool terminal block 34. Note that the male positive and negative terminals 40 from the tool terminal block 34 simultaneously project into the openings 32 formed in the rails 24 on the upper portion 25 of the battery pack housing 18, but do not make electrical contact with any terminals in the battery power supply module 14. Similarly, the remaining two blade terminals 30 from the battery terminal block 22 project into empty guideways 36 in the tool terminal block 34.

Figure 3B:
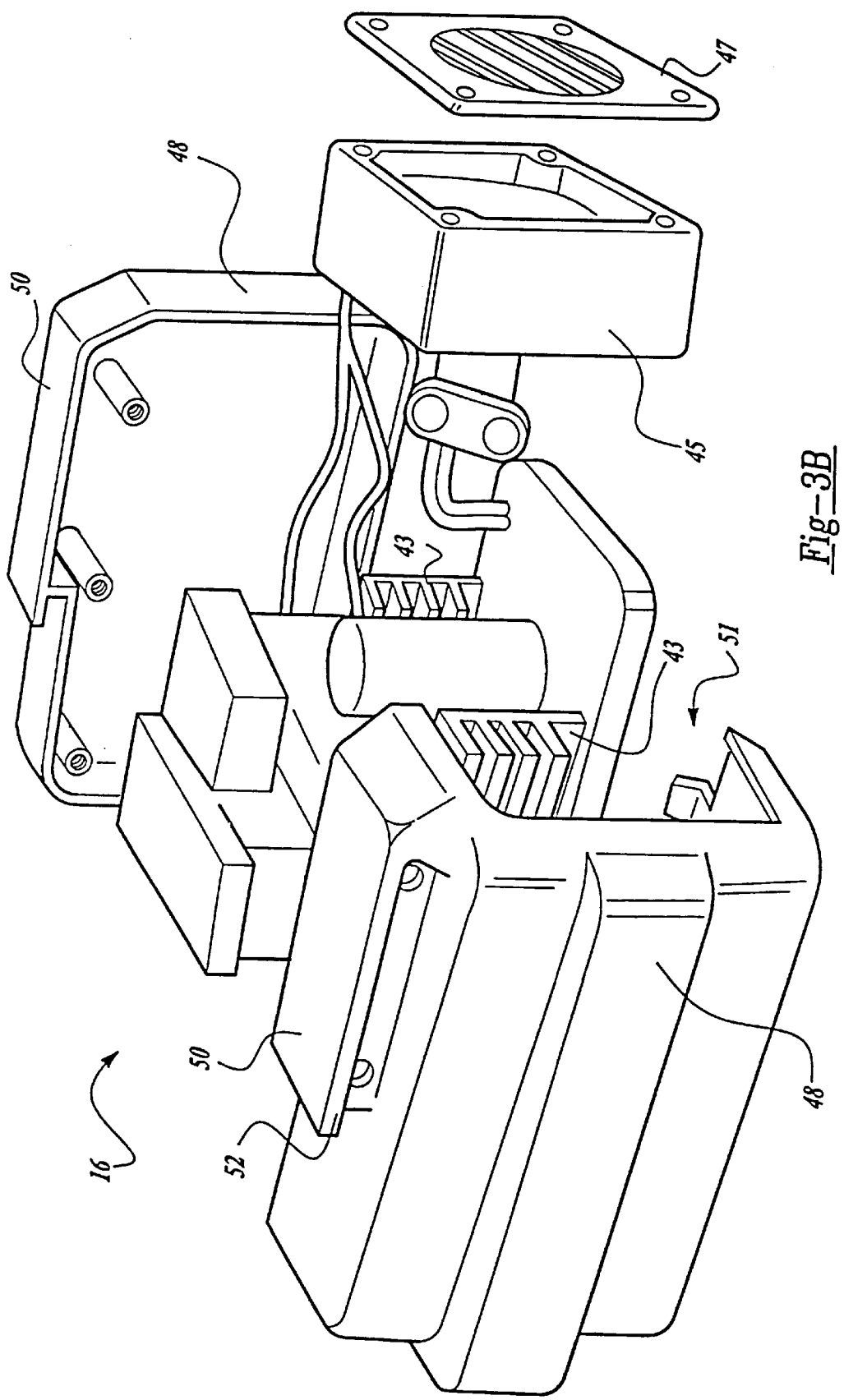
FIG. 3B is a three-dimensional exploded view of the power converter module.

Returning to FIG. 2 with reference to FIG. 3B, the AC/DC converter module 16 according to the present invention is adapted to convert 115 volts AC house current to 24 volts DC. The housing 48 of the converter module 16 in the preferred embodiment is configured to be substantially similar to the housing 18 of the battery power supply module 14. In this regard, the housing 48 includes first and second clam shell halves joined at a longitudinally extending parting line. An upper portion 50 of the housing 48 includes a pair of guide rails 52 similar to those of the battery power supply module 14 for engaging the channels 13 in the tool housing. The upper portion 50 also defines a recess (not shown) which includes a latch (not shown) for preventing the inadvertent removal of the converter module 16. The housing 48 also defines a recess 51 in which a fan 45 is adapted for providing cooling airflow to the converter module 16. Attached to the fan 45 is a fan cover 47 for preventing foreign objects from impeding the operation of the fan 45. Within the housing 48 several heatsinks 43 provide heat spreading and cooling for selected power converter components.

Figure 7:
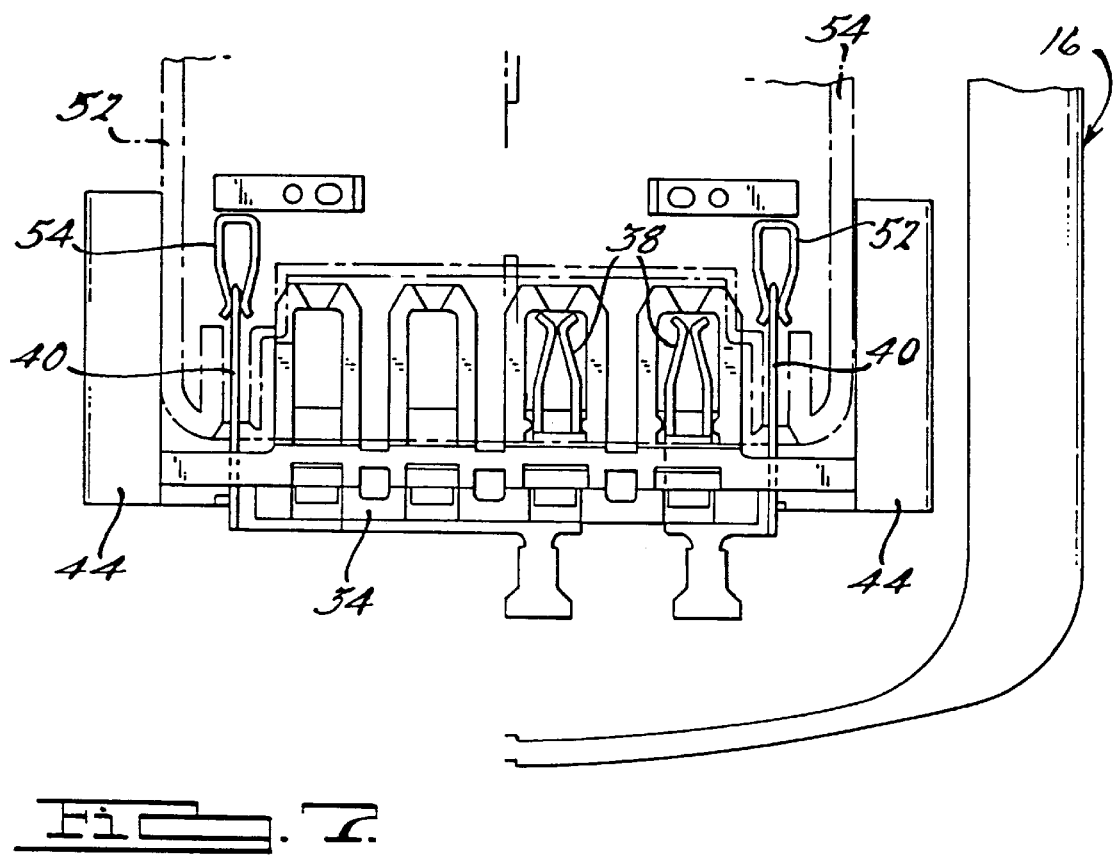
FIG. 7 is a two-dimensional view of the interface between the AC/DC power converter module and the power tool terminal block.
Figure 12:
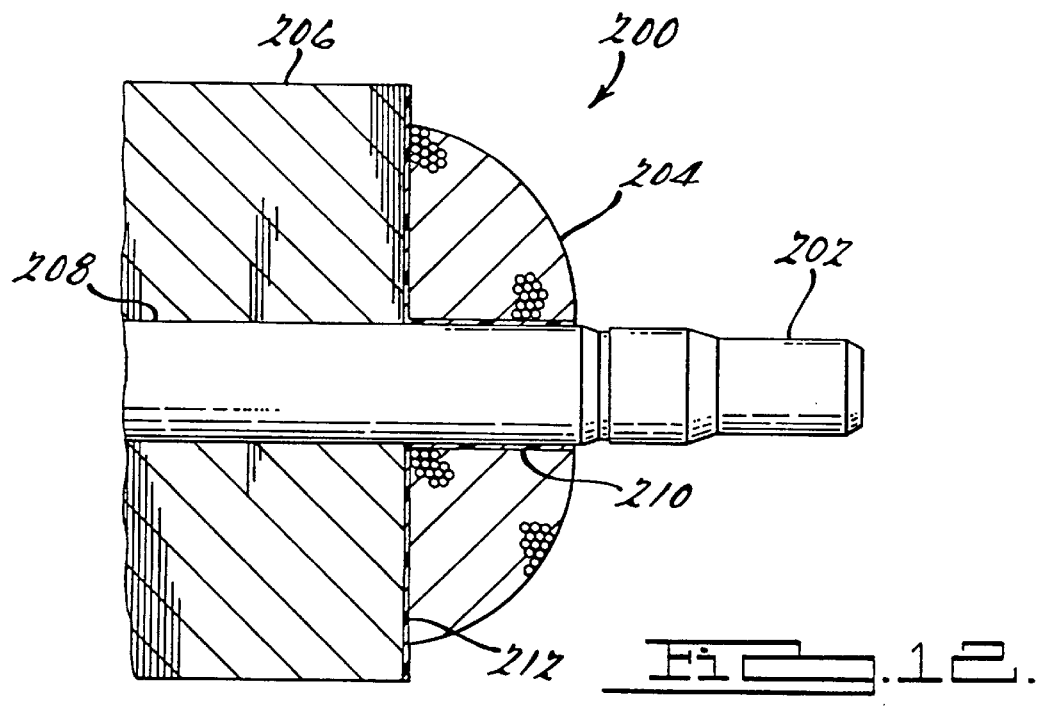
FIG. 12 is a cross-sectional view of an armature of a non-double insulated DC power tool motor.

With additional reference to FIG. 7, the interface between the converter module 16 and tool terminal block 22 is shown. The converter module 16 includes a pair of female terminals 54 that are adapted to receive the male terminals 40 of the tool terminal block 22. In a manner similar to that described above in connection with the installation of the battery power supply module 14 on the tool 12, the guide rails 52 on the upper portion 50 of the converter housing 48 are adapted to engage the laterally spaced rails 44 on the tool terminal block 34 as the converter module 16 is installed on the tool 12 to ensure proper alignment between the female connectors 54 of the converter module 16 and the male connectors 40 of the tool 12.

Due to the non-isolated nature of the AC/DC converter module 16 in the present invention, the female terminals 54 are recessed within the upper portion 50 of the housing 48 of the converter module 16 to meet safety requirements. In the preferred embodiment, the female terminals 54 are recessed within the housing 48 of the converter module 16 by at least 8 mm. 115 volt AC power is converted to 24 volt DC power by the converter module 16 and delivered to the tool 12 through the female terminals 54. When the converter module 16 is operatively installed on the tool 12, the female terminals 38 of the tool terminal block 34 are electrically inoperative.

The presently preferred embodiment of the AC/DC power converter module 16 is a fixed-frequency, non-isolated, buck-derived topology; however, the principles of the invention can be extended to variable-frequency converters and topologies other than buck-derived, such as Cük and flyback converters. The power converter module 16 is designed to convert an unregulated AC voltage to a regulated DC voltage that is usable by the power tool 12. For example, the converter module 16 can convert an input of 120 volts, 60 Hz AC to any low-level DC voltage less than 42 volts that is required by the power tool 12, such as 24 volts DC.

Figure 8:
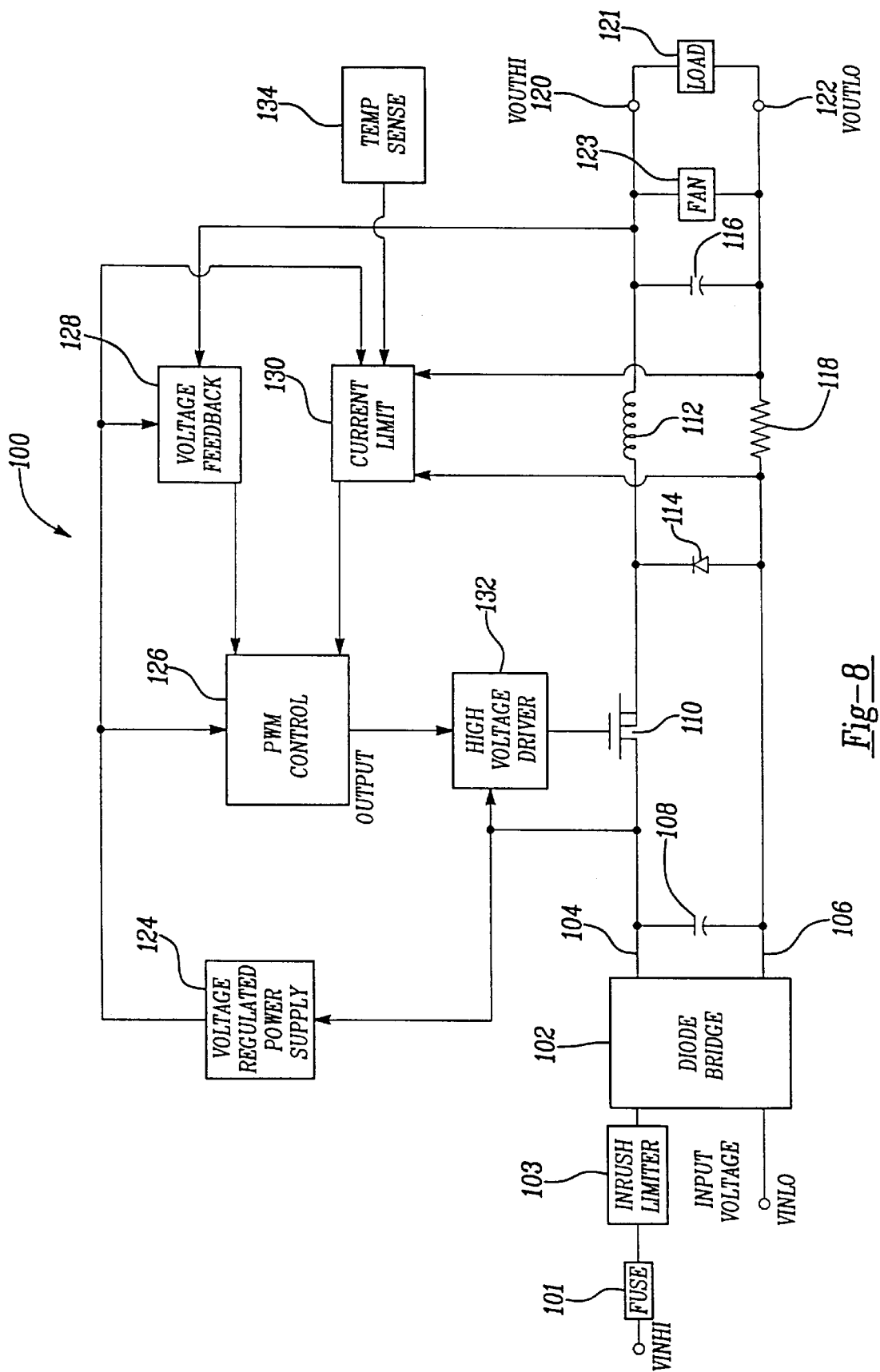
FIG. 8 is a block diagram of a power converter assembled and contained within the AC/DC power converter module of FIG. 2.

As illustrated in block diagram form in FIG. 8, the power converter module 16 includes a fuse 101 in series with diode bridge 102. A power plug and cord (refer to FIG. 2) connect from fuse 101 to the other input of diode bridge 102. The output of diode bridge 102 is applied between high side line 104 and an inrush limiter 103 connected to ground reference line 106. The rectified output voltage of diode bridge 102 is filtered by the input capacitor 108. The resulting filtered voltage is nominally 165 volts DC. The input capacitor 108 connects to the drains of parallel power MOSFETs 110a and 110b that act as a voltage controlled switch. When MOSFETs 110a and 110b are in the ON state the impedance between the drain and source is low. When in the OFF state the impedance between drain and source is very high, effectively preventing current flow. The sources of MOSFETs 110a and 110b connect to the junction of output inductor 112 and the cathode of free-wheeling output diode 114. The other side of output inductor 112 connects to output capacitor 116. Current sense resistor 118 connects between the output capacitor 116 and the anode of the freewheeling diode 114. The anode of output diode 114 also connects to ground reference line 106. The voltage across output capacitor 116 is applied to the output of power converter module 16 across outputs VOUTHI 120 and VOUTLO 122, which connect to the pair of female terminals 54. Fan 123 is connected in parallel with output capacitor 116. Diode bridge 102, MOSFET 110, and free-wheeling output diode 114 all mount on heat sinks that provide heat spreading and a thermal path for dissipated power.

Figure 10:
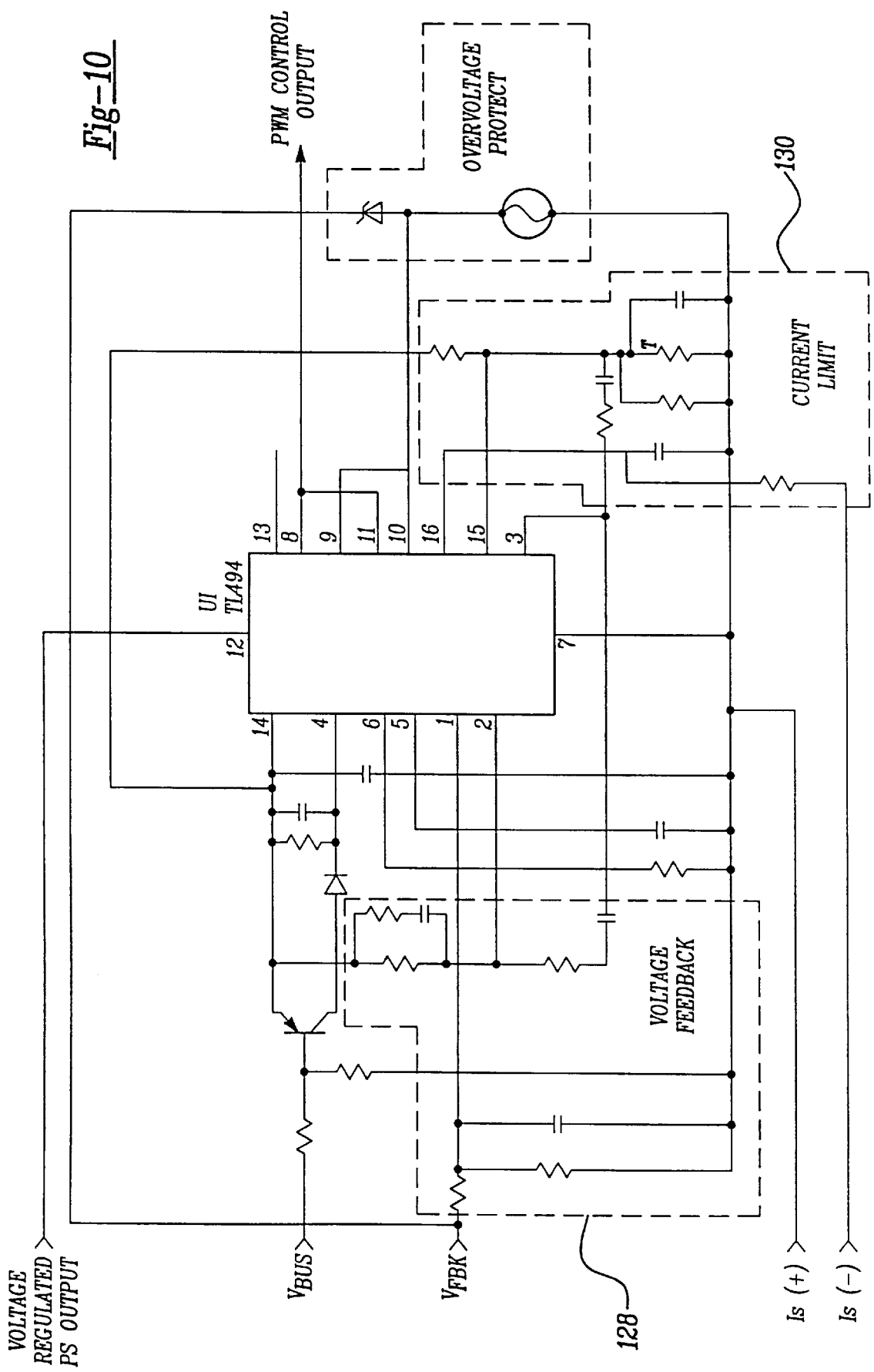
FIG. 10 is a schematic diagram of the control circuit of the power converter of FIG. 8.

FIGS. 8 and 10 illustrate the circuitry that provides control and protection functions for power converter module 16 which includes voltage regulated power supply 124, PWM control 126, voltage feedback 128, current limit 130, and temperature sense 134. The voltage regulated power supply 124 connects across input capacitor 108 to provide a low power, regulated low voltage output to supply power to the internal circuitry of power converter module 16. The regulated low voltage output as well as the remainder of the internal circuitry is referenced to ground reference line 106. VOUTHI 120 connects to voltage feedback 128 which connects to PWM control 126. The current sense resistor 118 connects to current limit 130 which also is connected to temperature sense 134. The output of current limit 130 connects to PWM control 126. The arrangement of components that comprise voltage regulated power supply 124, PWM control 126, voltage feedback 128, current limit 130, and temperature sense 134 are well known in the art.

Figure 9:
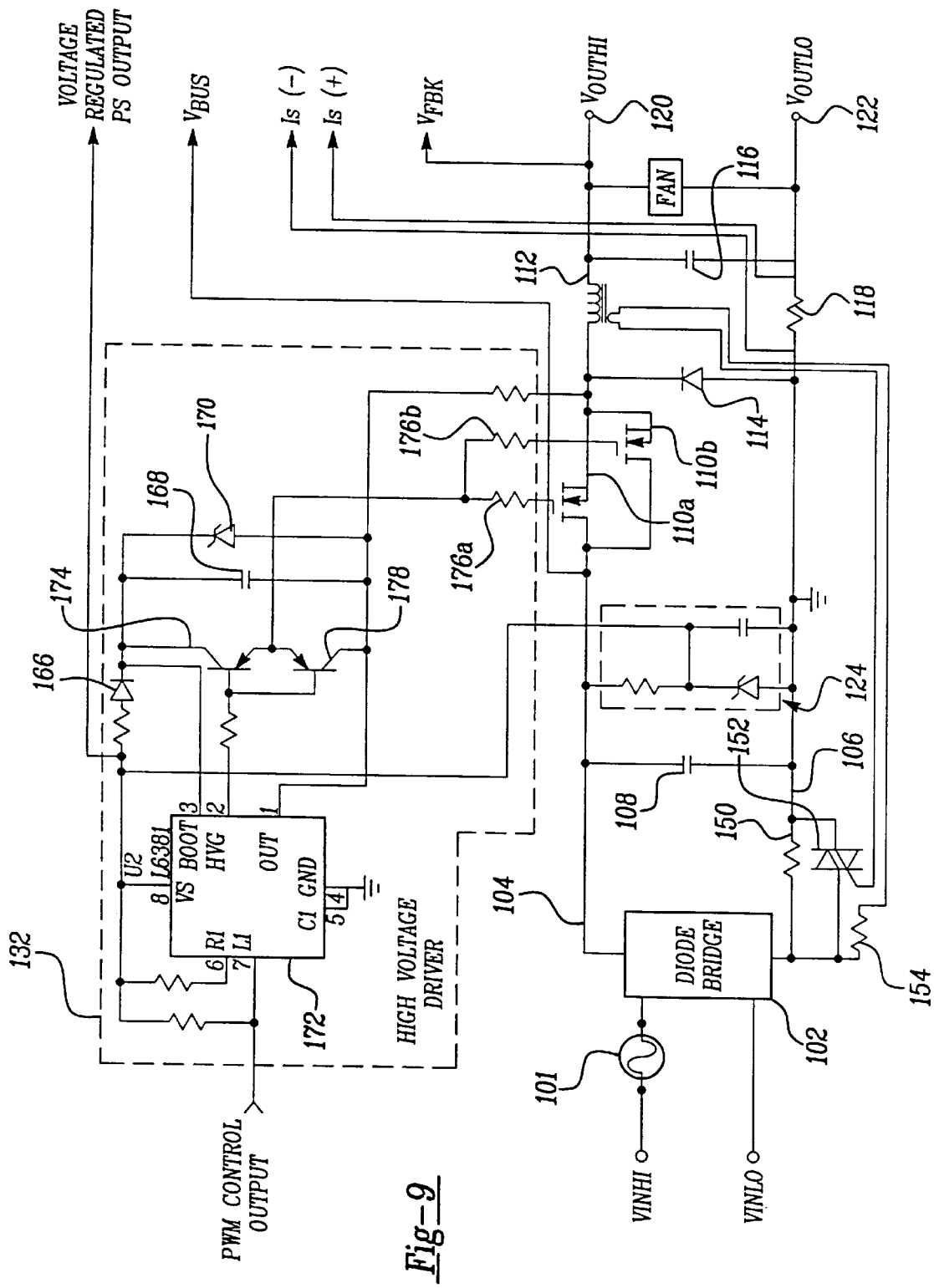
FIG. 9 is a schematic diagram of the power stage of the power converter of FIG. 8.

FIGS. 9 and 10 illustrate the circuitry that provides the power conversion function for power converter module 16 which includes high voltage driver 132 and power stage components. The output of PWM control 126 connects to high voltage driver 132 which level shifts the output of PWM control 126 to drive the gates of MOSFETs 110a and 110b. The arrangement of components that comprise high voltage driver 132 are well known in the art. In the presently preferred embodiment of the invention an SGS-Thomson L6381 high-side driver 172 with associated components comprises the high voltage driver 132. However, other circuit configurations for level-shifting the PWM output are within the scope of the invention, such as discrete component configurations and Motorola high-side driver chips.

Referring to FIG. 8, at initial power-on of power converter module 16, the power plug and cord are connected to an AC power source. The AC voltage is rectified by diode bridge 102 and applied across input capacitor 108. Current from the AC source surges as it flows through fuse 101, inrush limiter 103, diode bridge 102, and begins to charge input capacitor 108. The magnitude of the surge in current is limited to a safe level by the action of the inrush limiter 103 which is a high impedance initially, but rapidly changes to a low impedance. In the present embodiment the inrush limiter 103 consists of a triac 152 in parallel with a resistor 150 that is triggered by current flowing through output inductor 112. However, other well known circuits are also envisioned, such as a series thermistor, and a high valued series resistor in parallel with a controlled semiconductor that is triggered by temperature, time, or current magnitude. As the voltage across input capacitor 108 rises towards its nominal value of 165 volts DC the voltage regulated power supply 124 becomes active and begins to supply voltage to the internal circuitry of the power converter module 16 including PWM control 126. During the initial charging of input capacitor 108, the triac 152 remains off forcing return current to flow through resistor 150, thereby limiting the peak value of the inrushing current. The triac 152 remains OFF until the output of PWM control 126 becomes active driving the MOSFETs 110a and 110b to the ON state, at which time current flowing through output inductor 112 couples through a sense winding of inductor 112 to trigger the triac ON.

The PWM control 126 in the present embodiment is a Texas Instruments TL494 with the associated components as depicted in FIG. 10. There are numerous other control chips which could be used, such as UC1845 and SG1625. The output of PWM control 126 is disabled until the regulated output of voltage regulated power supply 124 exceeds 6.4 volts, at which time soft-start mode is enabled. Prior to the beginning of soft-start the oscillator of PWM control 126 begins to operate. The present embodiment switches at a fixed frequency of 40 kHz, although higher or lower frequencies are within the scope of the invention. During steady-state operation of power converter module 16 the PWM control 126 output is a low-voltage square-wave signal having a variable pulse-width, where the pulse-width is adjusted to maintain a regulated output voltage at outputs VOUTHI 120 and VOUTLO 122. During soft-start the pulse-width of the PWM control 126 output is initially zero, gradually increasing to a steady-state value that results in the output voltage being regulated at a desired voltage. The duration of soft-start mode is controlled by the selection of component values in PWM control 126 and is well known in the art. The purpose of soft-start is to limit the current and voltage stress of the power converter module 16 components during the time period when output capacitor 116 is being charged up to its nominal steady-state value. As the voltage across output capacitor 116 approaches its steady-state value the output of voltage feedback 128 rises towards its steady-state value, resulting in the pulse-width of PWM control 126 attaining a steady-value that regulates the voltage across output capacitor 116 at the desired value. The feedback network in the present embodiment is a lag-lead-lag-lead configuration with well known design requirements to maintain a stable operation of power converter module 16. During steady-state operation the output from PWM control 126 which is level-shifted by the high voltage driver 132 repetitively drives the MOSFETs 110a and 110b into an ON state and an OFF state at the switching frequency.

Figure 11:
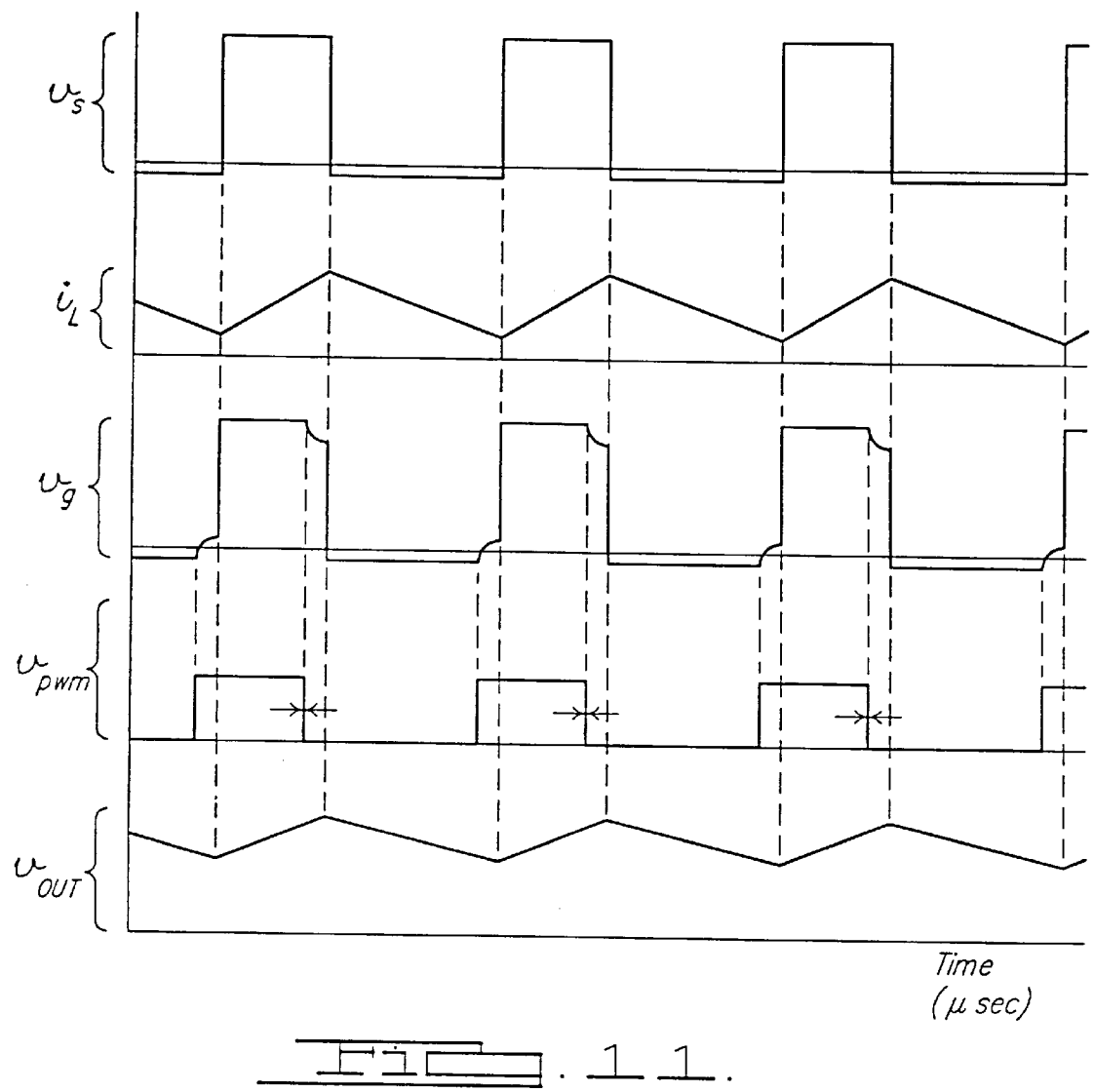
FIG. 11 is a signal diagram showing the voltage and current waveforms associated with the power converter.

Referring to waveforms vs, iL, and vout of FIG. 11 in addition to FIG. 8, when MOSFETs 110a and 110b are in the ON state, the voltage from input capacitor 108 is passed through to the sources of MOSFET 110a and 110b, vs, and impressed on the input of output inductor 112 reverse biasing free-wheeling diode 114. The voltage across output inductor 112 during the ON state is equal to the voltage across input capacitor 108 minus the voltage across output capacitor 116, vout. The positive voltage across inductor 112 causes current, iL, through inductor 112 to increase at a linear rate. The current splits between VOUTHI 120 and output capacitor 116 with the DC component flowing to VOUTHI 120 and the AC component substantially flowing through output capacitor 116. Current returning from load 121 flows from VOUTLO 122 through current sensor resistor 118 and input capacitor 108 thereby completing the current path.

When the MOSFETs 110a and 110b are switched to the OFF state, they present a high impedance to the voltage from input capacitor 108 decoupling that voltage from the remainder of the circuit. During this period free-wheeling diode 114 is active. The current, iL, from output inductor 112 which previously flowed through MOSFETs 110a and 110b now flows through free-wheeling output diode 114. With output diode 114 conducting, the voltage, vs, at the input to output inductor 112 is approximately one diode drop below ground reference line 106. The voltage across output inductor 112 is equal to negative one volt minus the voltage across output capacitor 116. The negative voltage across inductor 112 causes current through inductor 112 to decrease at a linear rate. The current again splits between VOUTHI 120 and output capacitor 116 with the DC component flowing through VOUTHI 120 and the AC component substantially flowing through output capacitor 116. The current returning from load 121 flows from VOUTLO 122 through current sense resistor 118 and free-wheeling output diode 114, thereby completing the current path. The MOSFETs 110a and 110b remain in the OFF state for the remainder of the cycle time period.

Again referring to FIG. 8 with additional reference to waveforms vg and vpwm of FIG. 11, the output of PWM control 126 is level-shifted by high voltage driver 132 in order to drive power MOSFETs 110a and 110b to either the ON state or the OFF state. During the transition from the OFF state to the ON state, the PWM control 126 output voltage, vpwm, transitions low which causes the output of driver 172 to transition high, thus biasing the base emitter junction of PNP transistor 178 turning it OFF. At the same time NPN transistor 174 turns ON. Current flows through NPN transistor 174 and resistors 176a and 176b into the gates of power MOSFETs 110a and 110b charging up the internal gate-source capacitance, raising the MOSFETs 110a and 110b gate voltage, vg, above ground before returning from the sources of MOSFETs 110a and 110b to filter capacitor 168. The increasing voltage across the gate-source of MOSFETs 110a and 110b causes the MOSFETs 110a and 110b to begin to turn ON, causing the source voltage of MOSFETs 110a and 110b to increase from minus one volt relative to ground reference line 106 to a value approaching the value of voltage across input capacitor 108 and additionally causing the MOSFETs 110a and 110b gate voltage, vg, to increase to the value of voltage across input capacitor 108 plus the MOSFETs gate-source voltage. As the source voltage of MOSFETs 110a and 110b increases, the decoupling diode 166 becomes reverse biased decoupling the diode 166 from the remainder of the high voltage driver 132. Filter capacitor 168 remains referenced to the source of MOSFETs 110a and 110b and thereby provides the energy required to maintain the gate-source voltage of MOSFETs 110a and 110b during the remainder of the ON state.

The PWM control 126 output voltage, vpwm, transitions from a low to a high value to initiate the start of the OFF state. The high-side driver 172 inverts and level shifts the signal which causes NPN transistor 174 to turn OFF and PNP transistor 178 to turn ON. The energy stored in the internal gate-source capacitance of MOSFETs 110a and 110b discharges through resistor 176 and PNP transistor 178. When the gate-source voltage of MOSFETs 110a and 110b decreases to less than approximately four volts MOSFETs 110a and 110b turn OFF. Free-wheeling diode 114 becomes active which causes the voltage at the sources of MOSFETs 110a and 110b to decrease to minus one volt. Current then flows through decoupling diode 166 into filter capacitor 168 recharging the capacitor 168. Parallel zener diode 170 clamps the voltage across filter capacitor 168 to a safe value that does not overstress the gate-source junctions of the MOSFETs 110a and 110b. The circuit remains in the OFF state until the output of PWM control 126 once again transitions low.

In addition to controlling pulse width to maintain a constant output voltage, PWM control 126 also varies the pulse width in response to an output from current limit 130 to protect power converter module 16 from excessive output current loads. Output current flows through current sense resistor 118 causing a voltage to develop that is proportional to the output current. The voltage across resister 118 is compared to a reference voltage derived from the PWM control reference. When the output current is greater than a pre-determined maximum level the output of current limit 130 causes PWM control 126 to reduce the pulse width of the output. The reduced duty cycle causes the voltage at outputs VOUTHI 120 and VOUTLO 122 to decrease until the resulting output current is less than the pre-determined maximum level.

Temperature sense 134 protects power converter module 16 from overtemperature stress of MOSFET 110 and output diode 114. In the presently preferred embodiment a thermistor is employed as temperature sense 134 to monitor the temperature of heatsinks 43. If the temperature rises due to overload, debris blocking an air intake, or other fault condition, temperature sense 134 modifies the current limit reference voltage, thereby causing the PWM control 126 to generate a shorter pulse width. The shorter pulse width results in a lower output voltage and output current that corresponds to a lower overall output power. The lower output power causes a reduction in the power dissipated in the components of power converter module 16, resulting in lower component temperatures.

Returning to FIG. 1, although the power tool 12 of the present invention is designed to be powered by a relatively low voltage DC power source (i.e., a DC source less than 50 volts), the housing 201 of the power tool in the preferred embodiment is nonetheless double insulated from the electrical system of the tool. As is well known to those skilled in the art, power tools designed to be operated by a high voltage power source, such as a conventional AC or corded power tool, are typically constructed so that the housing of the tool is double insulated from the electrical system of the tool for safety reasons. In this manner, the operator of the tool is protected against electrical shock in the event of a short in the electrical system of the tool. Cordless or DC powered tools are powered by low voltage power sources and therefore do not require such safety measures. Consequently, conventional DC powered tools do not insulate the housing from the electrical system of the tool.

There are of course, many DC powered portable devices that are alternatively powered from high voltage AC house current. To enable this alternative operation, however, AC/DC powered devices universally employ transformers to step down the high AC voltage and thereby isolate the device from the high voltage AC power source.

While this solution may be acceptable for relatively low powered devices, such as portable stereos, the power requirements of many portable power tools necessitates the use of large step-down transformers which are not only bulky, but also very heavy. Consequently, DC powered tools that can alternatively be powered from AC house current have rarely been offered commercially.

The present invention solves this dilemma by providing a relatively light weight non-isolated AC to DC converter and then constructing the DC powered tool in a manner consistent with the double insulation safety requirements of a conventional AC powered tool. In other words, by eliminating transformer isolation in the present AC/DC power converter module 16, the DC output voltage supplied to the motor of the power tool is referenced to the 115 volt AC input. Consequently, double insulation of the tool housing from the electrical system of the power tool is required.

In addition, as discussed above in connection with the description of FIGS. 5–7, the power tool terminal block 34 according to the present invention is provided with independent male connectors 40 uniquely adapted to make electrical contact with, and thereby receive electrical power from, specially recessed female connectors 54 in the AC/DC converter module 16. Thus, despite the non-isolated construction of the present AC/DC converter module 16, all applicable safety requirements for operating a power tool from a relatively high voltage power source are satisfied.

FIGS. 12 through 17 depict the effect of employing double insulation within a motor and housing. Double insulation techniques are well known in the art. Double insulated tools are typically constructed of two separate layers of electrical insulation or one double thickness of insulation between the operator and the tool's electrical system. With specific reference to FIG. 12, a cross-sectional view of a non-double insulated DC motor armature 200 is illustrated. The armature 200 consists of a shaft 202 with a core built up over it. The core is composed of many laminations 206 with notches along the outer periphery to hold the armature windings 204. A gear or chuck (not shown) is built onto the shaft at one end of the armature 206 to provide a means of transferring rotational energy to the working end 208 (see FIG. 1) of the power tool 12. For example a gear mechanism would convert rotational energy to the forward and back motion used to drive a reciprocating saw. The path from the armature shaft 202 to the gear mechanism or chuck, and finally to the working end is electrically conductive. Therefore any electrical energy that exists on the armature shaft 202 is conducted to the working end, which is exposed to the operator of the power tool 12. Locations 208, 210, and 212 indicate areas of the rotor that could become energized through contact with electrically live assemblies if insulation is not employed. At location 208 the armature shaft 202 could be energized through contact with energized armature laminations 206. At location 210 the armature shaft 202 could be energized through contact with end turns of the armature windings 204. At location 212 the armature laminations 206 could be energized through contact to end turns of the armature windings 204.

Figure 13:
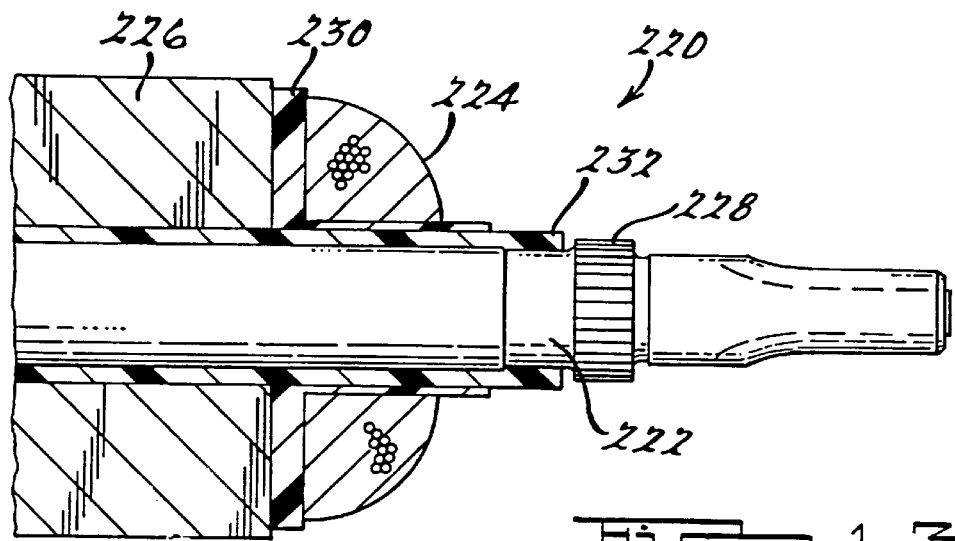
FIG. 13 is a cross-sectional view of an armature of DC power tool motor that employs a first method of double insulation.

Referring to FIG. 13, a first method of employing double insulation of the motor armature 220 of a power tool is illustrated. The armature 220 consists of a shaft 222 with a core built up over it. The core is composed of many laminations 226 with notches along the outer periphery to hold the armature windings 224. A chuck 228 is built onto the shaft at one end of the armature laminations 206 to provide a means of affixing a device such as a drill bit to the working end 208 (see FIG. 1) of the power tool 12. A molded plastic insulator 230 provides basic insulation between the armature windings 224 and the laminations 226 as well as between the shaft 222 and the windings 224. A press fit plastic tube insulator 232 encases the shaft 222 providing supplementary insulation to prevent the shaft from becoming energized if the basic insulation breaks down.

Figure 14:
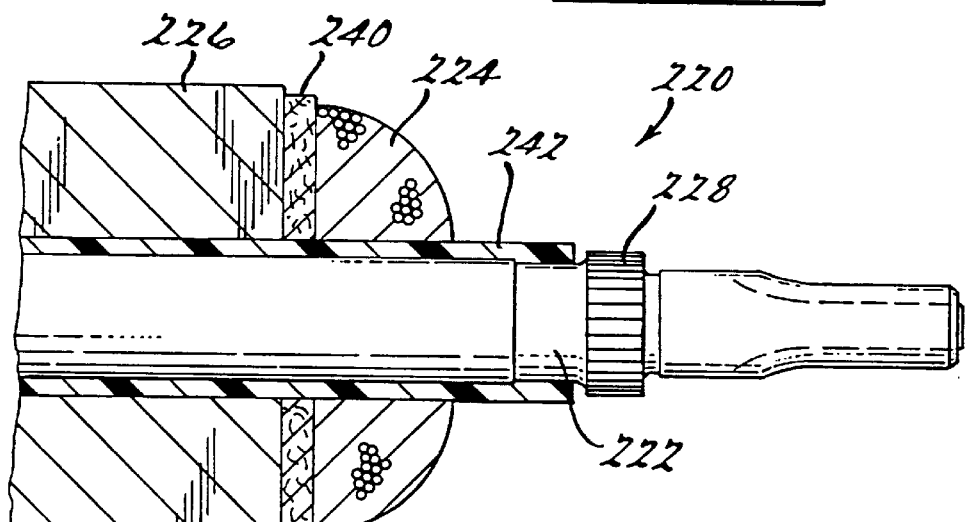
FIG. 14 is a cross-sectional view of an armature of DC power tool motor that employs a second method of double insulation.

Referring to FIG. 14, a second method of employing double insulation of the motor armature 220 of a power tool is illustrated. A paper insulator 240 provides basic insulation between the armature windings 224 and the laminations 226. A second insulator 242 of double thickness, 2 mm, encases the shaft 222 providing reinforced insulation, which substitutes for supplementary insulation, to prevent the shaft from becoming energized through electrical shorts to the laminations 226 or the armature windings 224.

Figure 15:
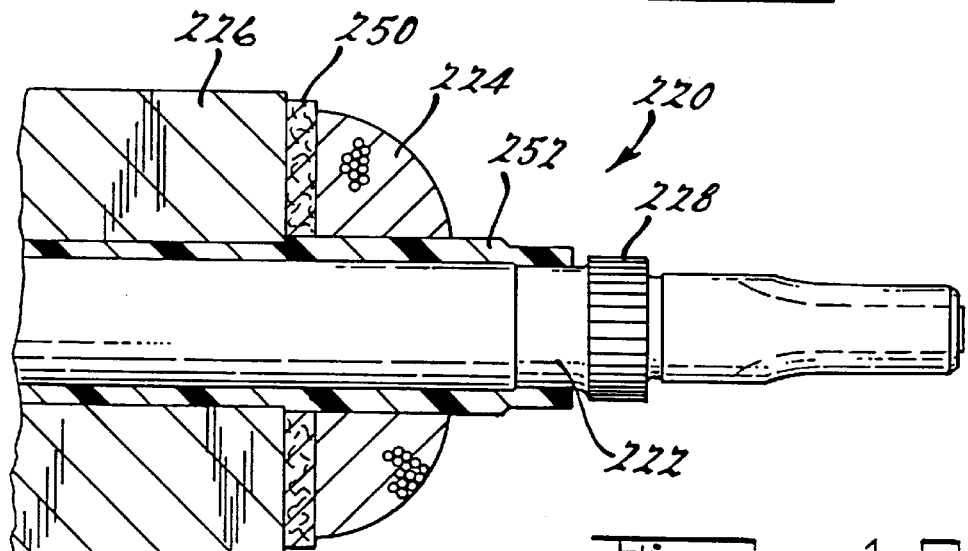
FIG. 15 is a cross-sectional view of an armature of DC power tool motor that employs a third method of double insulation.

Referring to FIG. 15, a third method of employing double insulation of the motor armature 220 of a power tool is illustrated. An insulator 250 of either paper or molded plastic provides basic insulation between the armature windings 224 and the laminations 226. An in situ molded thermoset plastic insulator 252 of double thickness encases the shaft 222 providing reinforced insulation, which substitutes for supplementary insulation, to prevent the shaft from becoming energized through electrical shorts to the laminations 226 or the armature windings 224.

Figure 16:
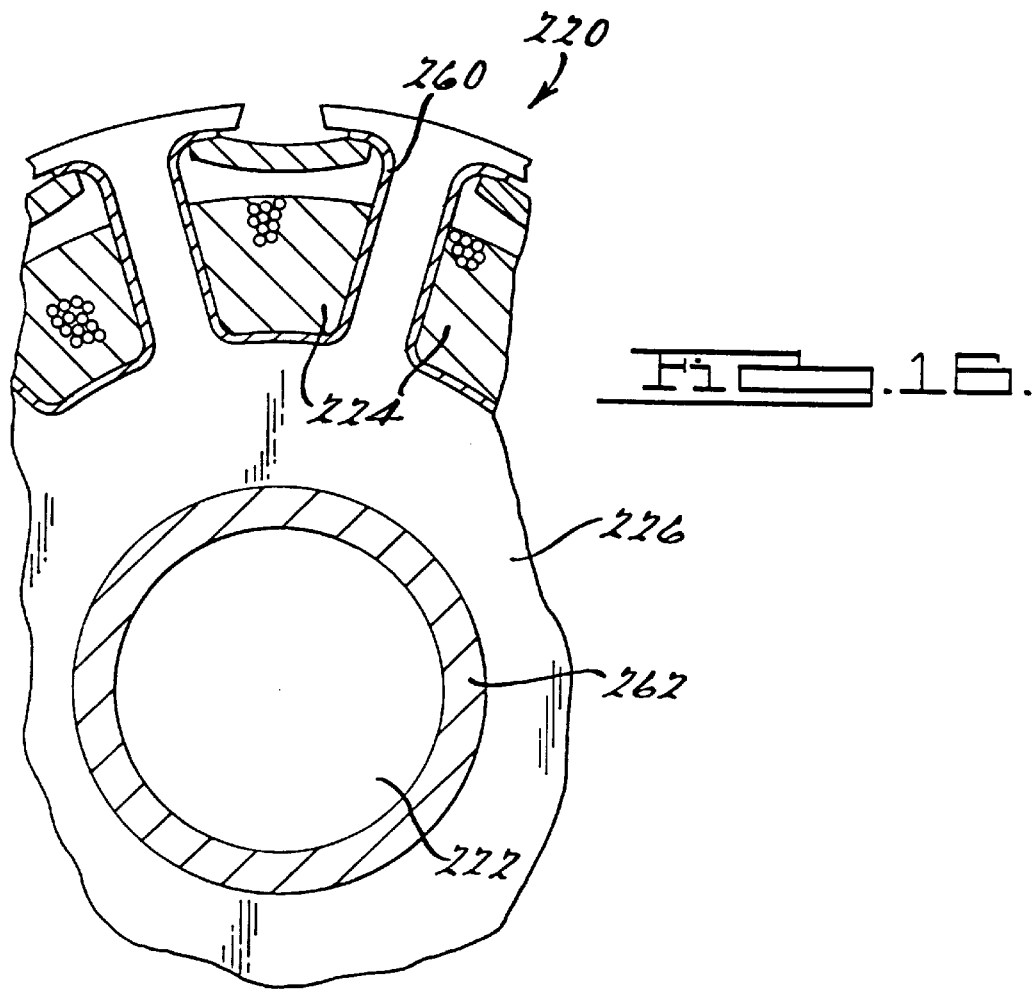
FIG. 16 is cross section through the center of the lamination stack of an armature for a DC power tool motor that employs double insulation.

Referring to FIG. 16, a cross-section through the center of the lamination stack of the motor armature 220 of a power tool is illustrated. A slot liner insulator 260 provides basic insulation between the armature windings 224 and the laminations 226. The slot liner insulator is constructed of any suitable electrical insulator material such as paper, coated paper, polyester, and vulcanized fiber. Supplementary insulation is provided by a glass reinforced polyester insulator sleeve 262 which encases the shaft 222. The insulator sleeve prevents the shaft from becoming energized if the basic insulation provided by slot liner 260 fails.

Figure 17:
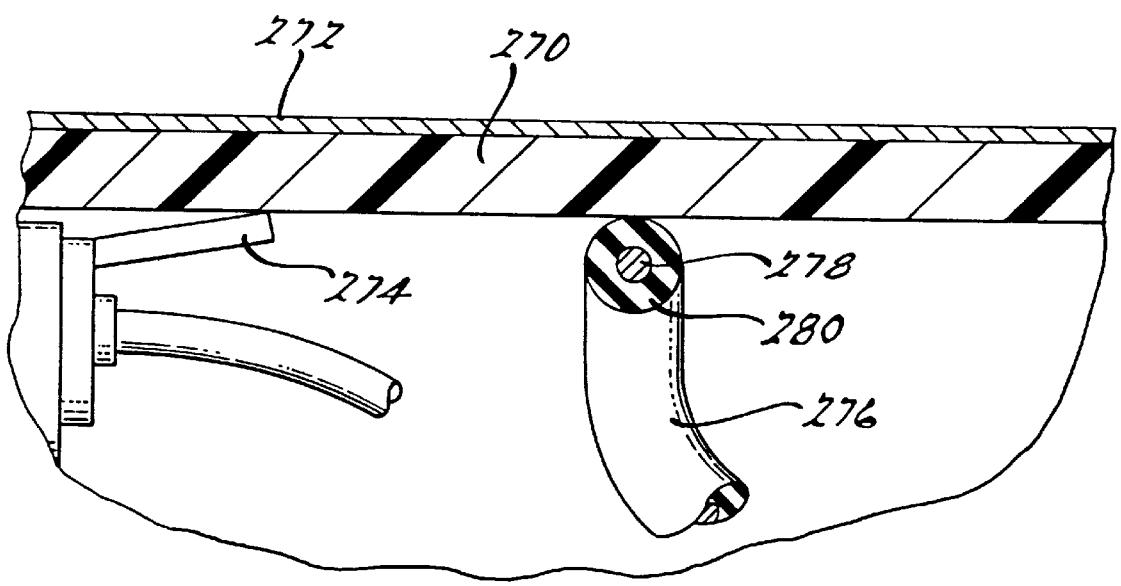
FIG. 17 is a cross-sectional view of a housing for a DC power tool that employs double insulation.

Referring to FIG. 17, a double insulated housing 270 of a power tool is illustrated. As is known in the art, the double insulation methods employed are intended to prevent electrical energy within the housing 270 from energizing the outside surface of the housing 270. The housing 270 is depicted with a hypothetical metal foil covering 272 on the outside surface to simulate interaction with an operator. Also illustrated are a ring terminal 274 and an insulated wire 276 that includes a conductive wire 278 and wire insulation 280. Electrical energy exists on both the ring terminal 274 and the conductive wire 278. Double insulation of the ring terminal 274 is provided by a double thickness, 2 mm, of housing material which serves as a reinforced insulator. The wire insulation 280 provides basic insulation for conductive wire 278. Supplementary insulation is provided by the housing 270 which prevents electrical energy that breaks through the wire insulation from energizing the outside surface of the housing 270.

The power converter module 16 initially converts the low frequency AC input to a high level DC voltage, then to a high frequency voltage level that is thereafter filtered to the lower voltage supply level of power tool 12. The power tool employs double insulation of the motor rather than transformer isolation of the power converter 16, thereby significantly reducing the cost and weight of the power converter module 16.

In addition, the converter module 16 is designed with a comparatively small number of components while providing an efficient conversion process. This further enhances the lightweight, compact features of the converter module 16. The size of the converter module 16 further permits the use of the converter in power-operated devices, such as the reciprocating saw 12, which heretofore were too small to support and contain conversion units providing power in a range of at least 50 watts and higher.

Further, while the preferred embodiment of the converter module 16 converts a low frequency, high voltage level to a low DC voltage level, the converter can be used to convert a high DC voltage level to a low voltage DC level by applying the high DC level directly to a suitable power cord and plug that connects to the input of converter module 16. In this manner, the power tool 12 could be operated from the high DC voltage source instead of the low DC voltage of the cells 26 and thereby conserve the charge life of the cells.

The converter module 16 could be designed to operate from external AC power sources other than 120 volts at 60 Hz. Without departing from the spirit and scope of the invention, the converter module 16 also could be designed to provide DC output voltage levels in a range of 3.6 to 48 volts. In a particular example, the converter could be adjusted to develop a DC output of 24 volts between the outputs VOUTHI 120 and VOUTLO 122 derived from an external AC source of 220 volts at 50 Hz as applied to a suitable power plug and cord. The converter module 16 could then be used to provide inexpensive dual mode capability for power-operated devices that operate at a DC voltage supply level of 24 volts.

The reciprocating saw 12 is merely illustrative of one example of many power-operated, cordless-mode devices that become more versatile because of the inventive cost efficient dual-mode capability. Other examples of power-operated cordless devices which are enhanced by the inventive concept include, but are not limited to, drills, screwdrivers, screwdriver-drills, hammer drills, jig saws, circular saws, hedge trimmers, grass shears, as well as battery-operated household products and the like.

Thus it will be appreciated from the above that as a result of the present invention, an inexpensive dual-mode corded/cordless system for power-operated devices is provided by which the principal objectives, among others, are completely fulfilled. It will be equally apparent and is contemplated that modification and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims and their legal equivalent.

I claim:

1. A corded/cordless system for power tools comprising:
a low-voltage DC power tool operable in a preselected voltage range, said power tool having an exterior, an interior, a pre-defined interface for mechanically and electrically mating with a power supply module, and a double-insulated case to prevent the conduction of electrical charge from the interior to the exterior of the power tool; and
a corded non-isolated power supply module mechanically and electrically configured to connect to a source of relatively high voltage electric power and to mate with the low-voltage DC power tool, said corded non-isolated power supply module being adapted to convert said relatively high voltage line power from the source of electric power to a DC voltage in the preselected voltage range suitable for powering the low-voltage DC power tool.

2. The corded/cordless system of claim 1 further comprising:
a cordless battery power supply module mechanically and electrically configured to mate with the low-voltage DC power tool and to contain a battery assembly having a DC voltage in the preselected voltage range suitable for powering the low-voltage DC power tool, said battery power supply module to provide power from the battery assembly to the DC power tool;
wherein the power tool is configured to receive power from either the corded non-isolated power supply module or the battery power supply module.

3. The corded/cordless system of claim 2 wherein the power tool pre-defined interface further comprises a physical envelope configuration to accept either of said corded non-isolated power supply module and said cordless battery power supply module.

4. The corded/cordless system of claim 3 wherein the power tool pre-defined interface further comprises an electrical connector operative to electrically connect to an electrical connector attached to either of said corded non-isolated power supply module and said cordless battery power supply module.

5. The corded/cordless system of claim 4 wherein the corded non-isolated power supply module electrical connector is a terminal block and the battery power supply module electrical connector is a terminal block.

6. The corded/cordless system of claim 3 wherein the power tool pre-defined interface further comprises a latch for releasably securing either of said corded non-isolated power supply module and said cordless battery power supply module.

7. The corded/cordless system of claim 1 wherein the power tool includes a motor.

8. The corded/cordless system of claim 1 wherein the corded non-isolated power supply module comprises:
a circuit to convert power from the source of relatively high voltage electric power to the DC voltage in the pre-selected voltage range, wherein the DC voltage is referenced to the power from the source of relatively high voltage electric power.

9. The corded/cordless system of claim 8 wherein the source of relatively high voltage electric power provides approximately 120 Vac, 60 Hz power.

10. A corded/cordless system for power tools comprising:
a low-voltage DC power tool operable in a preselected voltage range, said power tool having an exterior, an interior, a double-insulated case to prevent the conduction of electrical charge from the interior to the exterior of the power tool, and a pre-defined interface for mechanically and electrically mating with a power supply module;
said power tool pre-defined interface comprising:
a physical envelope configuration to accept the power supply module;
a terminal block operative to electrically connect to a terminal block attached to the power supply module; and
a latch for releasably securing the power supply module;
a corded non-isolated power supply module mechanically and electrically configured to connect to a source of relatively high voltage electric power and to mate with the low-voltage DC power tool, said corded non-isolated power supply module including a circuit to convert power from the source of relatively high voltage electric power to a DC voltage in the pre-selected voltage range suitable for powering the low-voltage DC power tool, wherein the DC voltage is referenced to the power from the source of relatively high voltage electric power;
a cordless battery power supply module mechanically and electrically configured to mate with the low-voltage DC power tool and to contain a battery assembly having a DC voltage in the preselected voltage range suitable for powering the low-voltage DC power tool, said battery power supply module to provide power from the battery assembly to the DC power tool; and
wherein the power tool is configured to receive power from either the corded non-isolated power supply module or the battery power supply module.

11. A method of supplying power to a DC power tool operable in a preselected voltage range, said power tool having exposed surfaces, the method comprising the steps of:
insulating the exposed surfaces of the DC power tool to prevent the surfaces from becoming electrically energized;
connecting a corded non-isolated power supply module to the power tool and to a source of relatively high voltage electric power;
converting power from the source of relatively high voltage electric power to a DC voltage that is not transformer isolated from the source of relatively high voltage electric power, wherein said DC voltage is within the pre-selected voltage range suitable for powering the DC power tool; and
powering the DC power tool with the DC voltage.

12. A DC low voltage power tool operable in a preselected voltage range comprising:
an electrical system for operating the tool;
a pre-defined electrical interface for mechanically and electrically mating with a power supply module to energize the electrical system; and
a double insulated tool casing enclosing the electrical system to prevent the conduction of electrical charge from the interior to the exterior of the power tool.

* * * * *